(12) United States Patent
Seres et al.

(10) Patent No.: US 10,776,893 B2
(45) Date of Patent: Sep. 15, 2020

(54) ADAPTIVE SMART SHELF FOR AUTONOMOUS RETAIL STORES

(71) Applicant: Everseen Limited, Blackpool, Cork (IE)

(72) Inventors: Dinu Seres, Timis (RO); Aleksa Milosevic, Belgrade (RS); Nemanja Jankovic, Belgrade (RS); Ovidiu Parvu, Timis (RO)

(73) Assignee: Everseen Limited, Blackpool, Cork (IE)

( * ) Notice: Subject to any disclaimer, the term of this patent is extended or adjusted under 35 U.S.C. 154(b) by 80 days.

(21) Appl. No.: 16/254,152

(22) Filed: Jan. 22, 2019

(65) Prior Publication Data

US 2020/0125854 A1    Apr. 23, 2020

Related U.S. Application Data

(60) Provisional application No. 62/748,073, filed on Oct. 19, 2018.

(51) Int. Cl.
*G06T 1/00* (2006.01)
*G06K 9/00* (2006.01)
*G06Q 10/08* (2012.01)

(52) U.S. Cl.
CPC ........ *G06T 1/0007* (2013.01); *G06K 9/00771* (2013.01); *G06Q 10/087* (2013.01); *G06T 2207/30232* (2013.01); *G06T 2207/30242* (2013.01)

(58) Field of Classification Search
None
See application file for complete search history.

(56) References Cited

U.S. PATENT DOCUMENTS

| 9,454,702 B2 | 9/2016 | Sen et al. |
| 10,044,985 B1 | 8/2018 | Parker |
| 2010/0121482 A1* | 5/2010 | Jackson ............... G06Q 10/087 700/217 |
| 2018/0114183 A1 | 4/2018 | Howell |
| 2019/0188434 A1* | 6/2019 | Drzymala .......... G06K 7/10861 |
| 2020/0019783 A1* | 1/2020 | Deng ..................... G02B 13/06 |
| 2020/0118077 A1* | 4/2020 | Schumacher ...... H04N 5/23238 |

FOREIGN PATENT DOCUMENTS

| JP | 2000358174 A | 12/2000 |
| KR | 20090074210 A | 7/2009 |

* cited by examiner

*Primary Examiner* — Justin P. Misleh
(74) *Attorney, Agent, or Firm* — Young Basile Hanlon & MacFarlane, P.C.

(57) ABSTRACT

An imaging arrangement for capturing one or more views of a horizontal shelf of an autonomous retail store includes an image sensor positioned at a back portion of the horizontal shelf, a top mirror mounted at a top portion of the horizontal shelf, to enable the image sensor to capture a top view of one or more products on the horizontal shelf, a front mirror mounted at a front top portion of the horizontal shelf, and a back mirror mounted at a back top portion of the horizontal shelf, wherein the back mirror is inclined at a pre-defined angle with respect to the front mirror, and wherein the front and back mirrors enable the image sensor to capture a front view of the one or more products on the horizontal shelf.

16 Claims, 7 Drawing Sheets

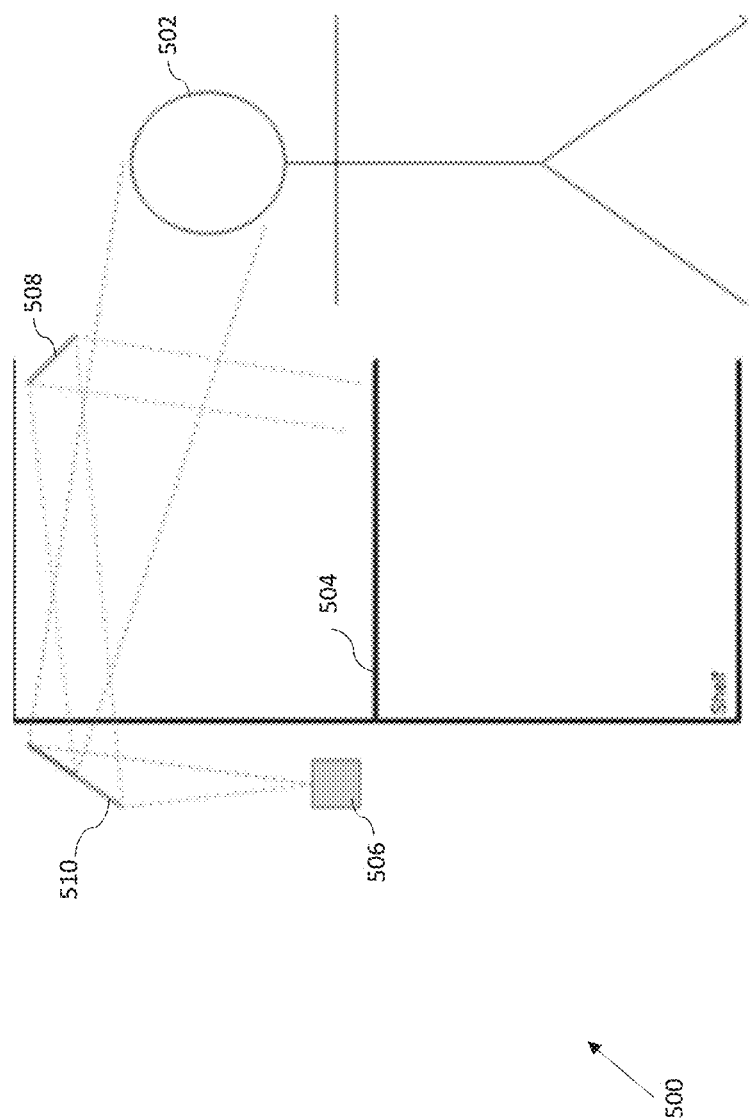

ADAPTIVE SMART SHELF FOR AUTONOMOUS RETAIL STORES

CROSS-REFERENCE TO RELATED APPLICATION

This application claims the benefit of U.S. Provisional Application Ser. No. 62/748,073 filed on Oct. 19, 2018, the contents of which are incorporated herein in its entirety by reference.

TECHNICAL FIELD

The present disclosure relates generally to autonomous retail stores, and more specifically to automated checkout at the shelf used in cashier-less stores.

BACKGROUND

In the retail world, autonomous stores are a big step forwards. An autonomous store offers shoppers a unique "checkout-free" experience using a combination of advanced technologies like artificial intelligence (AI), sensor fusion and computer vision.

In a typical autonomous store, multiple cameras may be installed inside the shelves of the store that may automatically pick up signals of a product that has been purchased off a particular shelf and then billed to the right customer. The bill may be presented to the user through an application of the store, executing on the customer's smart phone.

However, a major disadvantage associated with autonomous stores is that a large number of cameras are used to obtain a useful capture of the products. The higher the number of cameras that are on a shelf, the more accurate the information regarding how many products are currently on the shelf, and which product(s) have been taken by the customer. Also, in the current set up, the cameras are fully visible to the customer, and there is a possibility of the users tampering with the cameras. This makes the entire set up inefficient, expensive, cumbersome, and prone to errors.

In view of the above, there is a need for an autonomous store that overcomes the above-mentioned limitations, and is cost-efficient, easy to set-up, and is less prone to errors.

SUMMARY

According to a first aspect of the present disclosure, there is provided an imaging arrangement for capturing one or more views of a horizontal shelf of an autonomous retail store. The imaging arrangment may include an image sensor positioned at a back portion of the horizontal shelf. The imaging arrangment may further include a top mirror mounted at a top portion of the horizontal shelf, to enable the image sensor to capture a top view of one or more products on the horizontal shelf. The imaging arrangment may further include a front mirror mounted at a front top portion of the horizontal shelf. The imaging arrangment may further include a back mirror mounted at a back top portion of the horizontal shelf, wherein the back mirror is inclined at a pre-defined angle with respect to the front mirror, and wherein the front and back mirrors enable the image sensor to capture a front view of the one or more products on the horizontal shelf.

According to a second aspect of the present disclosure, there is provided an adaptive smart shelf for an autonomous retail store. The adaptive smart shelf may include an image sensor mounted at a back portion thereof. The adaptive smart shelf may further include a top mirror mounted at a top portion thereof, to enable the image sensor to capture a top view of one or more products kept on the adaptive smart shelf. The adaptive smart shelf may further include a front mirror mounted at a front top portion thereof, and a back mirror mounted at a back top portion thereof, wherein the back mirror is inclined at a pre-defined angle with respect to the front mirror, and wherein the front and back mirrors enable the image sensor to capture a front view of one or more products of the adaptive smart shelf. Each of the front, top and back mirrors is a dynamic mirror movably mounted thereto, and is configured to automatically rotate by a pre-defined angle, and translate in a horizontal direction by a pre-defined distance, based on current positions of one or more products on the adaptive smart shelf.

According to a third aspect of the present disclosure, there is provided an imaging arrangement for capturing one or more views of first and second horizontal shelves placed back to back in an autonomous retail store. The imaging arrangement may include an image sensor positioned at a common back portion of the first and second horizontal shelves, and first and second mirror arrangements for the first and second horizontal shelves respectively. Each of the first and second mirror arrangement includes a top mirror mounted at a top portion of corresponding horizontal shelf, to enable the image sensor to capture a top view of one or more products on corresponding horizontal shelf, a front mirror mounted at a front top portion of corresponding horizontal shelf, and a back mirror mounted at a top back portion of corresponding horizontal shelf, and inclined at a pre-defined angle with respect to the front mirror, wherein the front and back mirrors enable the image sensor to capture a front view of the one or more products on corresponding horizontal shelf.

Embodiments of the present disclosure substantially eliminate, or at least partially address the problems of the prior art by reducing the number of cameras per shelf to one camera per horizontal shelf (assume that one vertical shelf has 4-5 horizontal bars). The view of interest in this setup are top and front views of the products. The top view is used for counting and hand motion detection, and the front view is used for detecting the items on the shelf but also as a mechanism for detection of misplaced item from initial position. Also, an advantage of this approach is ability to obtain two views of the products by using only one camera, and cover multiple space allocations to get sufficient images to determine which action on the product has been. Another advantage also is that the position of the camera is fully hidden from the user. This makes system more robust to human action, which means human cannot reach the camera.

Further embodiments of the present disclosure facilitate capturing face of a user by using mirrors instead of cameras, and recognizing face of the user using face recognition techniques to determine which person is taking an action in front of the shelf, and by that information updating the cart of the specific person. Furthermore embodiments provide a mechanism to make the front mirror adjustable according to the amount of the products on the shelf.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

FIG. 5 illustrates a third imaging arrangement configured to capture a face of a user standing in front of a shelf of an autonomous retail store, in accordance with an embodiment of the present disclosure;

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF ILLUSTRATIVE EMBODIMENTS

The following detailed description illustrates embodiments of the present disclosure and ways in which they can be implemented. Although the best mode of carrying out the present disclosure has been disclosed, those skilled in the art would recognize that other embodiments for carrying out or practicing the present disclosure are also possible.

Figure 1:
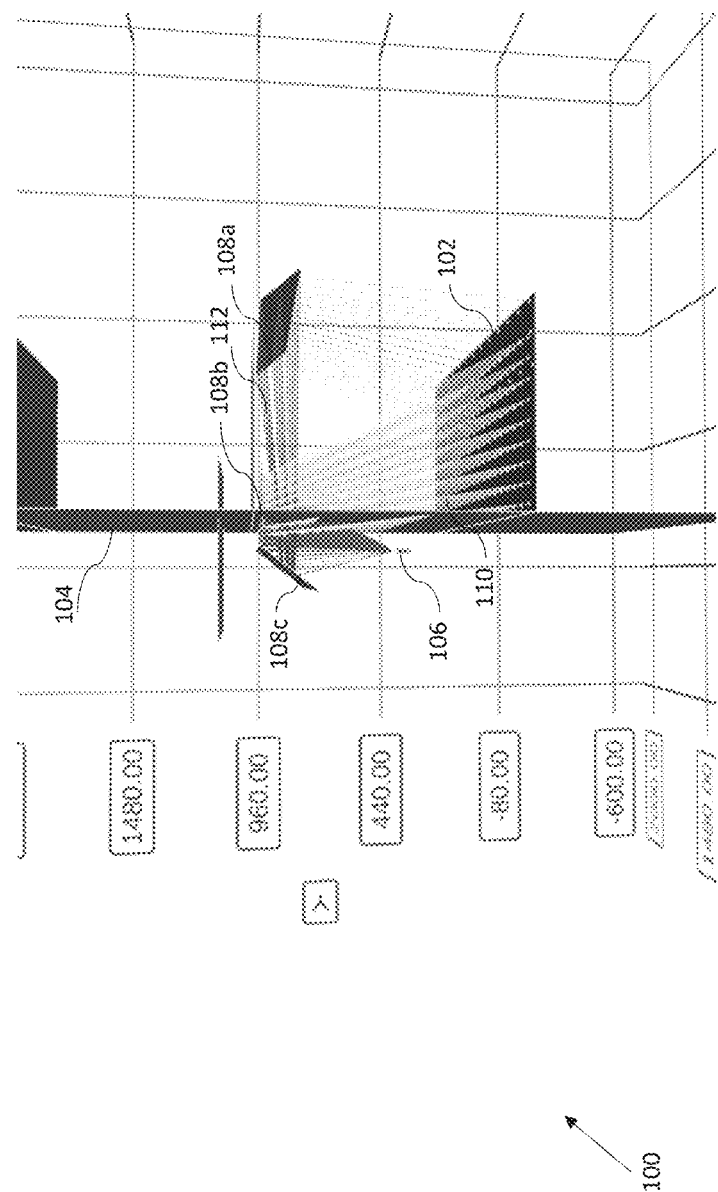
FIG. 1 illustrates a simulated view of a first imaging arrangement for capturing a shelf of a vertical shelf structure of an autonomous retail store, in accordance with an embodiment of the present disclosure.

FIG. 1 illustrates a simulated view of a first imaging arrangement 100 for capturing a horizontal shelf 102 of a vertical shelf structure 104 of an autonomous retail store, in accordance with an embodiment of the present disclosure.

The autonomous retail store may be described as a large retail organisation having a large number of departments in the same building under centralised control. It is a retail institution which handles a wide variety of merchandise under one roof. A single autonomous retail store may include a multiple number of vertical structures placed side by side for displaying products, wherein each vertical structure may include 4-5 shelves. One such shelf 102 of the vertical shelf structure 104 has been illustrated herein. The shelf 102 may include one or more products, so as to enable a user to buy the one or more products on their own. However, those products are not shown herein for the sake of brevity. In an exemplary embodiment, the shelf 102 is 1 m wide, and 40 cm deep.

The first imaging arrangement 100 includes an image sensor 106 positioned at a bottom back side of the shelf 102. In an example, the off-set of the image sensor 106 from the back of the shelf 102 is approximately 8 cm. Examples of the image sensor 106 may include a smart camera, that is configured to capture and process one or more images, and is also configured to transmit the processed images, to further remote devices via a communication network. The communication network may be any suitable wired network, wireless network, a combination of these or any other conventional network, without limiting the scope of the present disclosure. Few examples may include a Local Area Network (LAN), wireless LAN connection, an Internet connection, a point-to-point connection, or other network connection and combinations thereof.

The first imaging arrangement 100 further includes front, top, and back plane mirrors 108a, 108b, and 108c mounted therein for providing one or more views of the shelf 102 to the image sensor 106. In an embodiment of the present disclosure, the top plane mirror 108b is a flat mirror placed parallel to a bottom surface of the shelf 102 to enable the image sensor 106 to capture a top view of the shelf 102. The top view of the products in the shelf 102 may be represented by a first set of rays 110a which comes from the image sensor 106, and bounces from the top plane mirror 108b.

Further, the front and back plane mirrors 108a and 108c are installed at a pre-defined angle to enable the image sensor 106 to capture a front view of the shelf 102. Thus, the front view is obtained by using a combination of two angled mirrors 108a and 108c, where a second set of rays 112 represent the front view images.

In an exemplary embodiment of the present disclosure, the dimensions of the front plane mirror 108a are 60×8 cm, that of the top mirror 108b are 60×15 cm and that of the back mirror 108c are 60×10 cm.

In various embodiments, the top view of the shelf 102 enables counting of products kept on the shelf 102, and hand motion detection of an operator/user, and front view of the shelf 102 enables detection of products kept on the shelf 102, so as to detect a misplaced item from an initial position.

FIG. 1 is merely an example. One of ordinary skill in the art would recognize many variations, alternatives, and modifications of embodiments herein.

Figure 2:
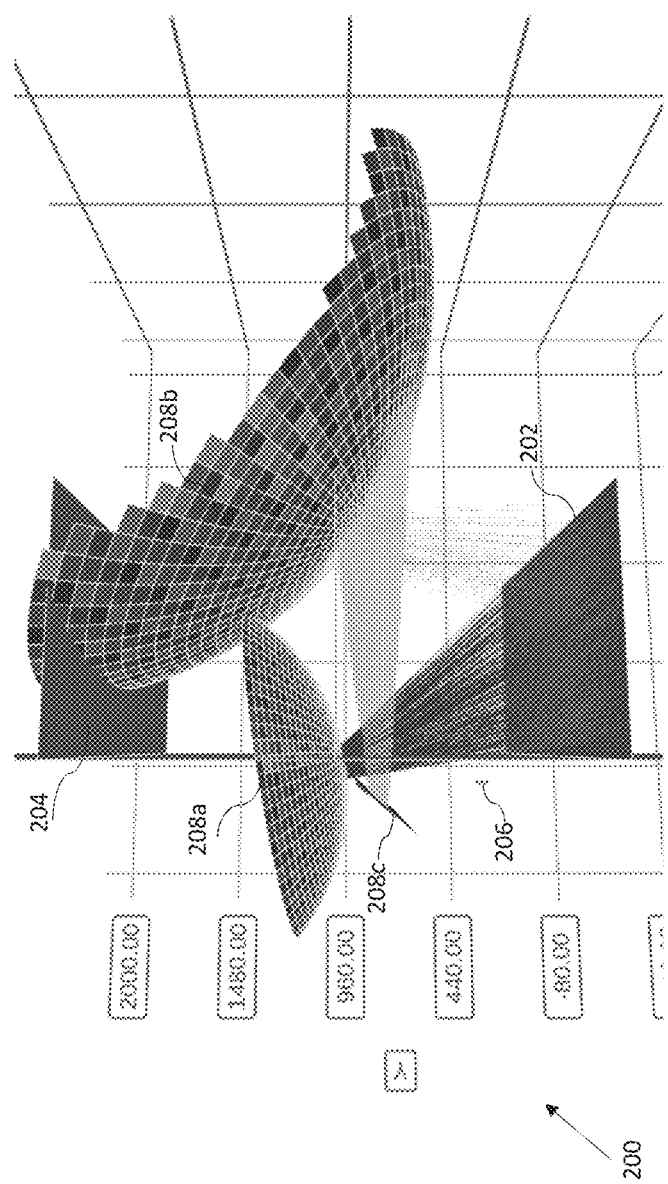
FIG. 2 illustrates a simulated view of a second imaging arrangement for capturing a shelf of a vertical shelf structure of an autonomous retail store, in accordance with an embodiment of the present disclosure.

FIG. 2 illustrates a simulated view of a second imaging arrangement 200 for capturing a shelf 202 of a vertical shelf structure 204 of an autonomous retail store, in accordance with an embodiment of the present disclosure.

The second imaging arrangement 200 includes an image sensor 206 positioned at a bottom back side of the shelf 202, and a top convex mirror 208a, a front convex mirror 208b, and a back-plane mirror 208c mounted therein for providing one or more views of the shelf 202 to the image sensor 206. Also shown are the reflections of the rays made by the top convex mirror 208a, the front convex mirror 208b, and the back-plane mirror 208c.

In one embodiment of the present disclosure, the top convex mirror 208a enables the image sensor 206 to capture a top view of the products kept in the shelf 202. Further, the combination of the back-plane mirror 208c and the front convex mirror 208b, enable the image sensor 206 to capture a front view of the products kept on the shelf 202. The top view enables counting of products kept on the shelf 202, and hand motion detection of an operator/user, and front view enables detection of products kept on the shelf 202, so as to detect a misplaced item from an initial position.

An advantage of the second imaging arrangement 200 over the first imaging arrangement 100 is that the second imaging arrangement 200 occupies lesser space due to smaller dimensions of the mirrors, provides better pixel per product value, and larger Field of View (FOV), however, the post processing of the images generated using the second imaging arrangement 200 is at a bit higher level, and increases the overall cost and effort involved therein.

In an exemplary embodiment, the specifications of the mirrors of the second imaging s arrangement 200 are:

1. Plane back mirror 208c of width w=600 mm and height h=150 mm
2. Front convex mirror 208b with focal length f=600 mm and diameter D=600 mm
3. Top convex mirror 208a with focal length f=250 mm and diameter D=250 mm FIG. 2 is merely an example. One of ordinary skill in the art would recognize many variations, alternatives, and modifications of embodiments herein.

Figure 3:
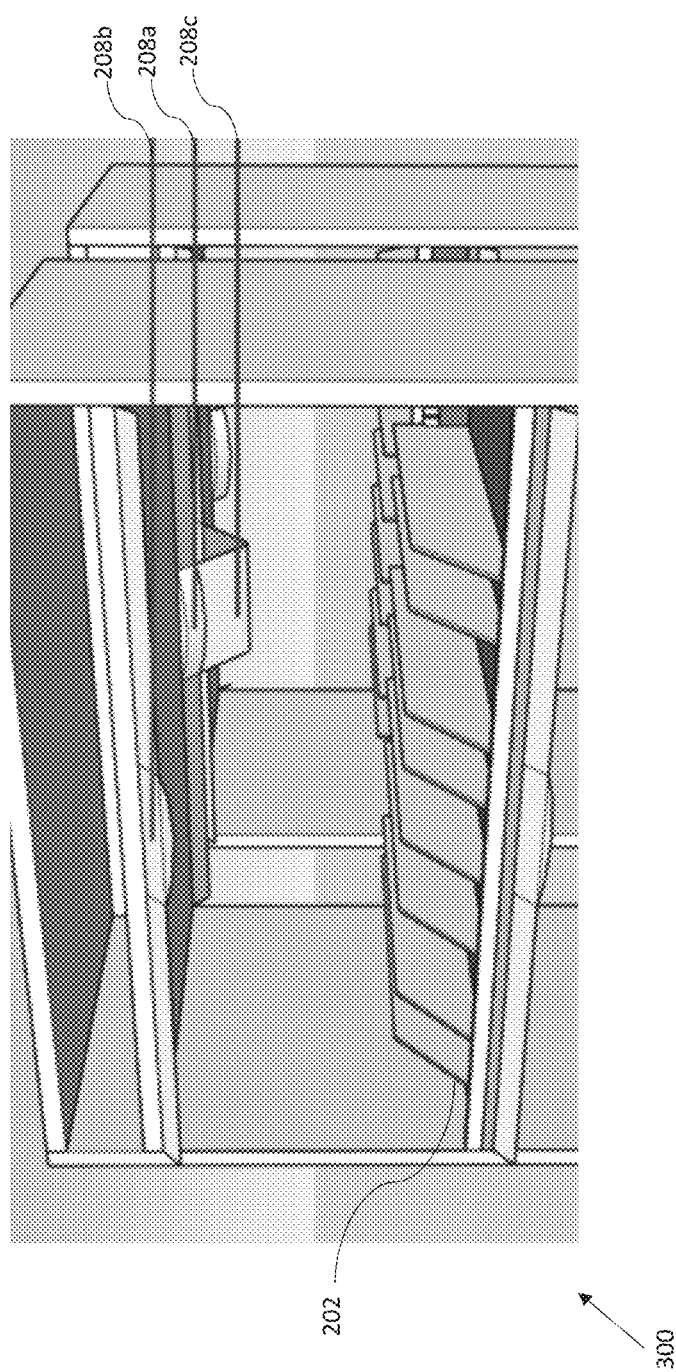
FIG. 3 illustrates a perspective view of the second imaging arrangement, in accordance with an embodiment of the present disclosure.

A perspective view 300 of the second imaging arrangement 200 in a shelf 202 of an autonomous store, has been illustrated clearly with reference to FIG. 3. In the perspective view, the second imaging arrangement 200 has been shown to be mounted at a top portion of the shelf 202 facing the bottom surface of the shelf 202. As shown herein, the top convex mirror 208a and the back plane mirror 208c are placed together side by side, whereas, the front convex mirror 208b is placed at a top front portion of the shelf 202.

Referring back to FIGS. 1 and 2, the first and second mirror arrangements 200 and 300 facilitate obtaining top and front views of the products of corresponding shelves 102 and 202 by placing only a single camera at a back side, and three plane/concave mirrors, thereby not only reducing the number of cameras per shelves, but also hiding the camera away from the user. This makes the first and second mirror arrangements 200 and 300 more robust to human action, as the humans cannot access the camera and malware corresponding imaging arrangement.

Figure 4A:
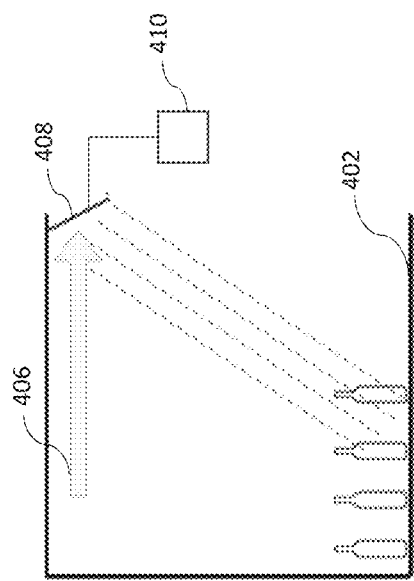
FIG. 4A illustrates a fixed mirror of one of the first and second imaging arrangements of a shelf of an autonomous retail store, in accordance with an embodiment of the present disclosure.

FIG. 4A illustrates a fixed mirror 400 of one of the first and second imaging arrangements 100 and 200 of a shelf 402 of an autonomous retail store, in accordance with an embodiment of the present disclosure. The fixed mirror 400 may be a front fixed mirror configured to capture a front view of the shelf 402 in combination with a corresponding back mirror, and detect a limited number of products 404 on the shelf 402 due to its limited field of view. In an example, the fixed mirror 400 may cover only couple of the first products in line, i.e if the user takes more than 25% of the products in the one line of products, for example, three bottles, the fixed front mirror 402 may remain blind and may not be able to detect which product is in specific lane. The arrow 406 herein represent the input rays reflected from the corresponding back mirror (not shown).

Figure 4B:
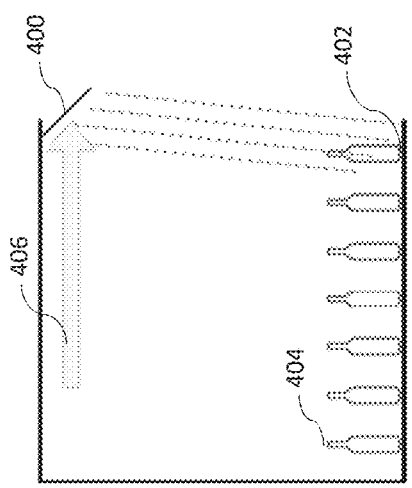
FIG. 4B illustrates a dynamic mirror of one of the first and second imaging arrangements of a shelf of an autonomous retail store, in accordance with an embodiment of the present disclosure.

FIG. 4B illustrates a dynamic mirror 408 of one of the first and second imaging arrangements 100 and 200 of the shelf 402, in accordance with an embodiment of the present disclosure. The dynamic mirror 408 may be a front movable mirror that is configured to dynamically capture a front view of the shelf 402 in combination with a corresponding back mirror.

In an embodiment of the present disclosure, the dynamic mirror 408 is configured to dynamically change its orientation to point towards first product which is left in the lane. The dynamic mirror 408 is configured to have two degrees of freedom, i.e. rotation and translation, facilitated by an electronic smart device 410. The electronic smart device 410 is coupled with the dynamic mirror 408 to enable the dynamic mirror 408 to rotate by a predefined angle or translate in a horizontal direction towards a corresponding back mirror. The electronic smart device 410 enables automatic rotation/translation of the dynamic mirror 408 based on feedback on a current position of the mirror 408, potential information of abnormal activities on the mirror 408 (someone pushing/rotating it by force), and also based on detection of position of the products left in the shelves using AI techniques. Thus, based on the inputs from the electronic smart device 410, the dynamic mirror 408 is capable of self-adjusting in non-standard situations.

In an embodiment of the present disclosure, each mirror of the imaging arrangment for the shelf 402 may be provided with a dynamic adjustment mechanism run by AI algorithms for automatically adjusting the alignment and position of corresponding mirror. Also, certain metrics may be fulfilled with multiple mirrors in order to get a high quality image for product detection. Thus, the shelf 402 would be smart enough to adjust itself to user needs and current setup of the products on the shelf 402. The mirror adjustment is dependent on multiple factors. There are a couple of metrics that determine the state of the product of the shelf, such as product counting using top down view from the mirrors, and the product detection by using a front view obtained by a combination of back and front mirror reflections. The input for the mirror adjustment algorithm is the current number of products in each line of the shelf. The input state of the shelf and the number of the products may be tracked over time, so as to adjust the mirror accordingly. The position and angle of the front mirror that points at a first product on the shelf is specified by a predefined LUT which matches an angle of the mirror to the specific point on the shelf. After mirror adjustment, it is detected whether the image is blurred or not. In a case where blur is detected, a blur correction algorithm is run to make the image suitable for a product detection algorithm. The mirror adjustment algorithm is executed each time an alert is generated that indicates no products are captured by the front view.

FIGS. 4A and 4B are merely examples. One of ordinary skill in the art would recognize many variations, alternatives, and modifications of embodiments herein FIG. 5 illustrates a third imaging arrangement 500 configured to capture a face of a user 502 standing in front of a shelf 504 of an autonomous retail store, in accordance with an embodiment of the present disclosure. The user may be an operator, or an employee of the store, or a customer who has come to the store to buy one or more products.

The third imaging arrangment 500 includes an imaging sensor 506 such as a camera positioned at a bottom back side of a shelf 504, a front mirror 508 positioned at a front side of the shelf 504, and an extended back mirror 510 positioned at a back side of the shelf 504. The top mirror is not shown herein, as it does not play any role in capturing the face of the user 502.

In an embodiment of the present disclosure, the extended back mirror 510 has an increased length along a corresponding longitudinal axis, so as to provide the face of the user 502 to the image sensor 506 through the extended back mirror 510. When the image sensor 506 points towards the extended back mirror 510, a front view of the products kept on the shelf 504 is taken. The images captured by the image sensor 506 using the extended back mirror 510 are then processed using face recognition techniques to extract the face of the user 502 from the captured images.

Figure 6:
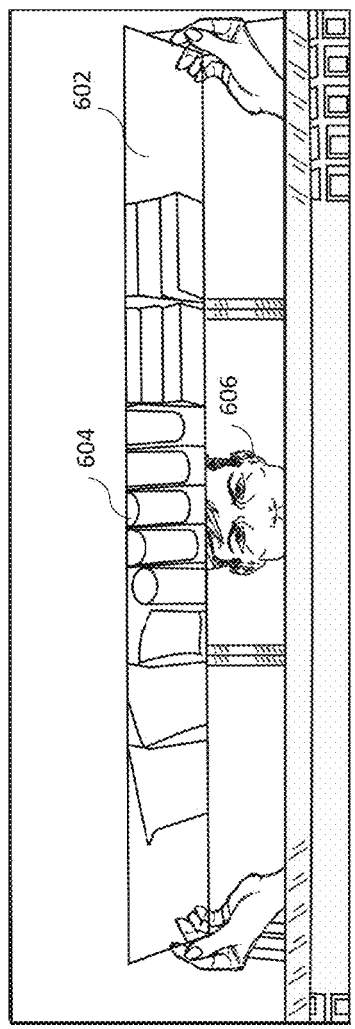
FIG. 6 illustrates an exemplary third imaging arrangement of FIG. 5, in accordance with an embodiment of the present disclosure.

FIG. 6 illustrates an exemplary back mirror 602, which is similar to the extended back mirror 510 of FIG. 5. As shown, the exemplary back mirror 602 has an increased length along a corresponding longitudinal axis. The back mirror 602 may be used to capture a front view of the products 604 kept on corresponding shelf, and/or capture an image of a user/operator 606.

Thus, the extended back plane mirror 510 of the third imaging arrangement 500 may facilitate face recognition of the user 502 without using an additional camera in the shelf 504, thereby reducing down the overall costs involved therein.

FIGS. 5 and 6 are merely examples. One of ordinary skill in the art would recognize many variations, alternatives, and modifications of embodiments herein.

In an embodiment of the present disclosure, the third imaging arrangement 500 may include the image sensor 506 at a bottom back side of the shelf 504, and camera grids as a replacement to the front and back mirrors 508 and 510 to gain more coverage by combining multiple cameras. An example of the cameras used for replacing the front and back mirrors 508 and 510 is a mobile phone size camera, that provides a predefined Field of View (FOV) and an image resolution. An advantage of replacing the mirrors by mobile phone sized cameras is that the mirrors 508 and 510 may take lot of time for manufacturing, and also, it becomes difficult to obtain the exact specifications of the mirror for a specific mirror quality.

Figure 7:
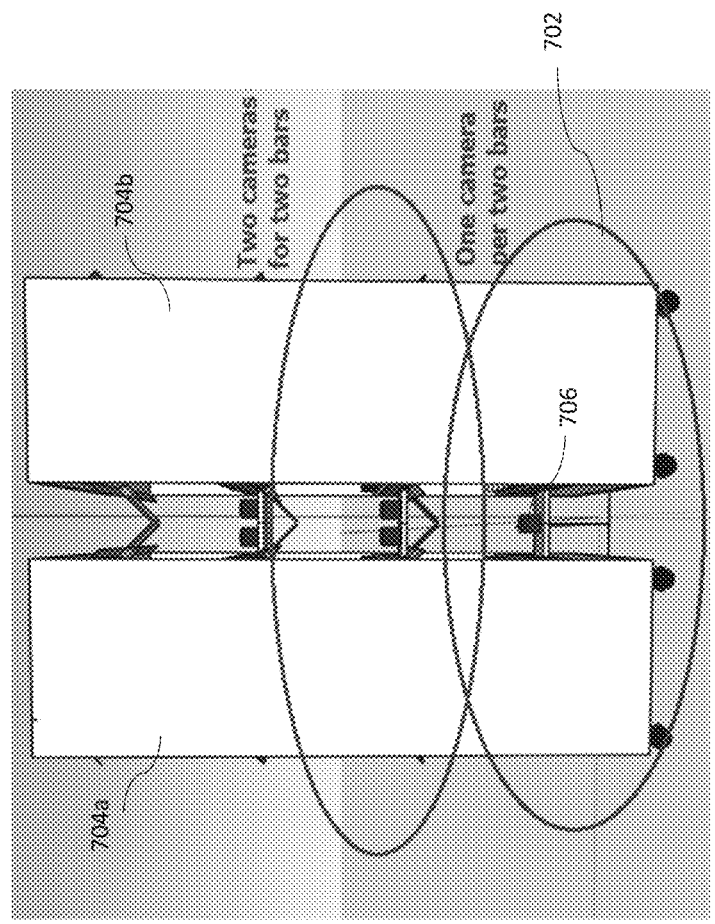
FIG. 7 illustrates a fourth imaging arrangement for capturing views of two horizontal shelves placed back to back, in accordance with an embodiment of the present disclosure.

FIG. 7 illustrates a fourth imaging arrangement 702 for capturing views of horizontal bars of two vertical shelf structures 704a and 704b placed back to back, in accordance with various embodiments of the present disclosure.

The fourth imaging arrangement 702 includes a single camera 706 for obtaining top and front views of the two horizontal bars of the two shelves 704a and 704b placed back to back. The advantage of the fourth imaging arrangement 702 is the ability to use the single camera 704 to cover two sections of the products in the two shelf structures 704a and 704b. This reduces the total number of cameras required in the autonomous store, thus making it less cumbersome and cost-efficient.

FIG. 7 is merely an example. One of ordinary skill in the art would recognize many variations, alternatives, and modifications of embodiments herein.

Modifications to embodiments of the present disclosure described in the foregoing are possible without departing from the scope of the present disclosure as defined by the accompanying claims. Expressions such as "including", "comprising", "incorporating", "consisting of", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An imaging arrangement for capturing one or more views of a horizontal shelf of an autonomous retail store, comprising:
an image sensor positioned at a back portion of the horizontal shelf;
a top mirror mounted at a top portion of the horizontal shelf, to enable the image sensor to capture a top view of one or more products on the horizontal shelf;
a front mirror mounted at a front top portion of the horizontal shelf; and
a back mirror mounted at a back top portion of the horizontal shelf, wherein the back mirror is inclined at a pre-defined angle with respect to the front mirror, and wherein the front and back mirrors enable the image sensor to capture a front view of the one or more products of the horizontal shelf,
wherein each of the front, top and back mirrors is a dynamic mirror movably mounted to the horizontal shelf, and
wherein the dynamic mirror is configured to automatically rotate by a pre-defined angle, and translate in a horizontal direction by a pre-defined distance, based on current positions of one or more products on the horizontal shelf.

2. The imaging arrangement of claim 1, wherein each of the top, front and back mirrors is a plane mirror.

3. The imaging arrangement of claim 1, wherein the back mirror is a plane mirror, and each of the top and front mirrors is a convex mirror.

4. The imaging arrangement of claim 1, wherein the image sensor includes a camera, that is configured to capture and process one or more images of the horizontal shelf, and transmit processed images to one or more remote devices via a communication network.

5. The imaging arrangement of claim 1, wherein the top view enables counting of one or more products kept on the horizontal shelf, and the front view enables identification of one or more products kept on the horizontal shelf.

6. The imaging arrangement of claim 1, wherein each of the front, back and top mirrors is a fixed mirror fixedly mounted to the horizontal shelf.

7. An adaptive smart shelf for an autonomous retail store, comprising:
an image sensor mounted at a back portion of the adaptive smart shelf;
a top mirror mounted at a top portion of the adaptive smart shelf, to enable the image sensor to capture a top view of one or more products kept on the adaptive smart shelf;
a front mirror mounted at a front top portion of the adaptive smart shelf; and
a back mirror mounted at a back top portion of the adaptive smart shelf, wherein the back mirror is inclined at a pre-defined angle with respect to the front mirror, and wherein the front and back mirrors enable the image sensor to capture a front view of one or more products kept on the adaptive smart shelf,
wherein each of the front, top and back mirrors is a dynamic mirror movably mounted to the adaptive smart shelf, and is configured to automatically rotate by a pre-defined angle, and translate in a horizontal direction by a pre-defined distance, based on current positions of one or more products present on the adaptive smart shelf.

8. The adaptive smart shelf of claim 7, wherein each of the top, front and back mirrors is a plane mirror.

9. The adaptive smart shelf of claim 7, wherein the back mirror is a plane mirror, and each of the top and front mirrors is a convex mirror.

10. The adaptive smart shelf of claim 7, wherein the image sensor includes a camera, that is configured to capture and process one or more images of the horizontal shelf, and transmit processed images to one or more remote devices via a communication network.

11. The adaptive smart shelf of claim 7, wherein the top view enables counting of one or more products kept on the horizontal shelf, and the front view enables identification of one or more products kept on the horizontal shelf.

12. The adaptive smart shelf of claim 7, wherein the dynamic mirror is coupled to an electronic smart device that enables automatic adjustment of an alignment and a position of corresponding dynamic mirror by executing one or more artificial intelligence (AI) algorithms.

13. An imaging arrangement for capturing one or more views of first and second horizontal shelves placed back to back in an autonomous retail store, the imaging arrangement comprising:
   an image sensor positioned at a common back portion of the first and second horizontal shelves; and
   first and second mirror arrangements for the first and second horizontal shelves respectively, wherein each of the first and second mirror arrangement comprises:
      a top mirror mounted at a top portion of a corresponding horizontal shelf, to enable the image sensor to capture a top view of one or more products on the corresponding horizontal shelf;
      a front mirror mounted at a front top portion of the corresponding horizontal shelf; and
      a back mirror mounted at a top back portion of the corresponding horizontal shelf, and inclined at a pre-defined angle with respect to the front mirror, wherein the front and back mirrors enable the image sensor to capture a front view of the one or more products on the corresponding horizontal shelf.

14. The imaging arrangement of claim 13, wherein each of the top, front and back mirrors is a plane mirror.

15. The imaging arrangement of claim 13, wherein the back mirror is a plane mirror, and each of the top and front mirrors is a convex mirror.

16. The imaging arrangement of claim 13, wherein each of the front, top and back mirrors is a dynamic mirror movably mounted thereto, and is configured to automatically rotate by a pre-defined angle, and translate in a horizontal direction by a pre-defined distance, based on current positions of one or more products on the corresponding horizontal shelf.

* * * * *